United States Patent
Ota (10) Patent No.: US 12,206,457 B2
(45) Date of Patent: Jan. 21, 2025

(54) OPTICAL TRANSMISSION LINE DETERMINATION APPARATUS, OPTICAL TRANSMISSION LINE DETERMINATION METHOD, AND NON-TRANSITORY COMPUTER READABLE MEDIUM

(71) Applicant: NEC Corporation, Tokyo (JP)

(72) Inventor: Morihiko Ota, Tokyo (JP)

(73) Assignee: NEC CORPORATION, Tokyo (JP)

(*) Notice: Subject to any disclaimer, the term of this patent is extended or adjusted under 35 U.S.C. 154(b) by 145 days.

(21) Appl. No.: 18/119,213

(22) Filed: Mar. 8, 2023

(65) Prior Publication Data
US 2023/0308187 A1 Sep. 28, 2023

(30) Foreign Application Priority Data
Mar. 25, 2022 (JP) .................... 2022-050537

(51) Int. Cl.
H04B 10/00 (2013.01)
H04B 10/079 (2013.01)
H04B 10/294 (2013.01)
H04B 10/50 (2013.01)
H04J 14/00 (2006.01)

(52) U.S. Cl.
CPC ..... *H04B 10/506* (2013.01); *H04B 10/07957* (2013.01); *H04B 10/294* (2013.01)

(58) Field of Classification Search
CPC .... H04B 10/07; H04B 10/075; H04B 10/079; H04B 10/0793; H04B 10/0795; H04B 10/07951
See application file for complete search history.

(56) References Cited

U.S. PATENT DOCUMENTS

2019/0334616 A1* 10/2019 Zhong ............... H04B 10/07
2022/0286201 A1* 9/2022 Mazur ............... H04J 14/06

FOREIGN PATENT DOCUMENTS

| JP | 2005-341022 A | 12/2005 |
| JP | 2008-241443 A | 10/2008 |
| JP | 2009-177587 A | 8/2009 |
| JP | 2009-267928 A | 11/2009 |
| JP | 2010-028470 A | 2/2010 |

* cited by examiner

Primary Examiner — Daniel G Dobson
(74) Attorney, Agent, or Firm — Sughrue Mion, PLLC (57) ABSTRACT

A length calculation unit calculates, based on a transmission time required for an optical signal transmitted from a first optical transmission apparatus to a second optical transmission apparatus through an optical transmission line to be transmitted through the optical transmission line, a length of the optical transmission line. A wavelength dispersion calculation unit calculates a wavelength dispersion per unit length of the optical transmission line based on a wavelength dispersion of the optical signal received by the second optical transmission apparatus and the length of the optical transmission line. A type determination unit determines a type of the optical transmission line based on information indicating a correspondence relationship between a value of the wavelength dispersion per unit length and the type of the optical transmission line and the calculated wavelength dispersion per unit length of the optical transmission line.

6 Claims, 7 Drawing Sheets

OPTICAL TRANSMISSION LINE DETERMINATION APPARATUS, OPTICAL TRANSMISSION LINE DETERMINATION METHOD, AND NON-TRANSITORY COMPUTER READABLE MEDIUM

INCORPORATION BY REFERENCE

This application is based upon and claims the benefit of priority from Japanese patent application No. 2022-50537, filed on Mar. 25, 2022, the disclosure of which is incorporated herein in its entirety by reference.

TECHNICAL FIELD

The present disclosure relates to an optical transmission line determination apparatus, an optical transmission line determination method, and a non-transitory computer readable medium.

BACKGROUND ART

In optical communication systems such as a WDM transmission system, a plurality of optical transmission apparatuses are communicably connected using various types of optical fibers. With recent increases in communication traffic, optical communication systems are becoming larger and more complex. Amidst this trend, various methods of checking characteristics of an optical fiber included in an optical communication system are being proposed (Japanese Unexamined Patent Application Publications No. 2010-28470, 2009-267928, 2009-177587, 2008-241443, and 2005-341022).

SUMMARY

However, with optical communication systems becoming larger and more complex as described above, identifying a type of each optical fiber and carrying out communication design suitable for each optical fiber based on the identification require a huge amount of effort. In particular, it is difficult to aggregate individual pieces of information on installed optical fibers by hand and perform design. In consideration thereof, there is a demand for automatically identify a type of an optical fiber and reduce the effort required to carry out system design based on the identified type of the optical fiber.

The present disclosure has been made in consideration of the circumstances described above and an example object thereof is to automatically determine a type of an optical fiber included in an optical communication system.

In a first example aspect of the present disclosure, an optical transmission line determination apparatus includes: a length calculation unit configured to calculate, based on a transmission time required for an optical signal transmitted from a first optical transmission apparatus to a second optical transmission apparatus through an optical transmission line to be transmitted through the optical transmission line, a length of the optical transmission line; a wavelength dispersion calculation unit configured to calculate a wavelength dispersion per unit length of the optical transmission line based on a dispersion of the optical signal received by the second optical transmission apparatus and the length of the optical transmission line; and a type determination unit configured to determine a type of the optical transmission line based on information indicating a correspondence relationship between a value of the wavelength dispersion per unit length and the type of the optical transmission line and the calculated wavelength dispersion per unit length of the optical transmission line.

In a second example aspect of the present disclosure, an optical communication system includes: a first optical transmission apparatus configured to send an optical signal; a second optical transmission apparatus configured to receive the optical signal; an optical transmission line configured to connect the first optical transmission apparatus and the second optical transmission apparatus to each other and to transmit the optical signal; and an optical transmission line determination apparatus configured to determine a type of the optical transmission line, wherein the optical transmission line determination apparatus includes: a length calculation unit configured to calculate, based on a transmission time required for the optical signal transmitted from the first optical transmission apparatus to the second optical transmission apparatus through the optical transmission line to be transmitted through the optical transmission line, a length of the optical transmission line; a wavelength dispersion calculation unit configured to calculate a wavelength dispersion per unit length of the optical transmission line based on a dispersion of the optical signal received by the second optical transmission apparatus and the length of the optical transmission line; and a type determination unit configured to determine a type of the optical transmission line based on information indicating a correspondence relationship between a value of the wavelength dispersion per unit length and the type of the optical transmission line and the calculated wavelength dispersion per unit length of the optical transmission line.

In a third example aspect of the present disclosure, an optical transmission line determination method includes: calculating, based on a transmission time required for an optical signal transmitted from a first optical transmission apparatus to a second optical transmission apparatus through an optical transmission line to be transmitted through the optical transmission line, a length of the optical transmission line; calculating a wavelength dispersion per unit length of the optical transmission line based on a dispersion of the optical signal received by the second optical transmission apparatus and the length of the optical transmission line; and determining a type of the optical transmission line based on information indicating a correspondence relationship between a value of the wavelength dispersion per unit length and the type of the optical transmission line and the calculated wavelength dispersion per unit length of the optical transmission line.

In a fourth example aspect of the present disclosure, a program causes a computer to execute processing of: calculating, based on a transmission time required for an optical signal transmitted from a first optical transmission apparatus to a second optical transmission apparatus through an optical transmission line to be transmitted through the optical transmission line, a length of the optical transmission line; calculating a wavelength dispersion per unit length of the optical transmission line based on a dispersion of the optical signal received by the second optical transmission apparatus and the length of the optical transmission line; and determining a type of the optical transmission line based on information indicating a correspondence relationship between a value of the wavelength dispersion per unit length and the type of the optical transmission line and the calculated wavelength dispersion per unit length of the optical transmission line.

According to the present disclosure, a type of an optical fiber included in an optical communication system can be automatically determined.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Hereinafter, an example embodiment of the present disclosure will be described with reference to the drawings. In the drawings, same elements are denoted by same reference signs and repetitive descriptions will be omitted when appropriate.

First Example Embodiment

Figure 1:
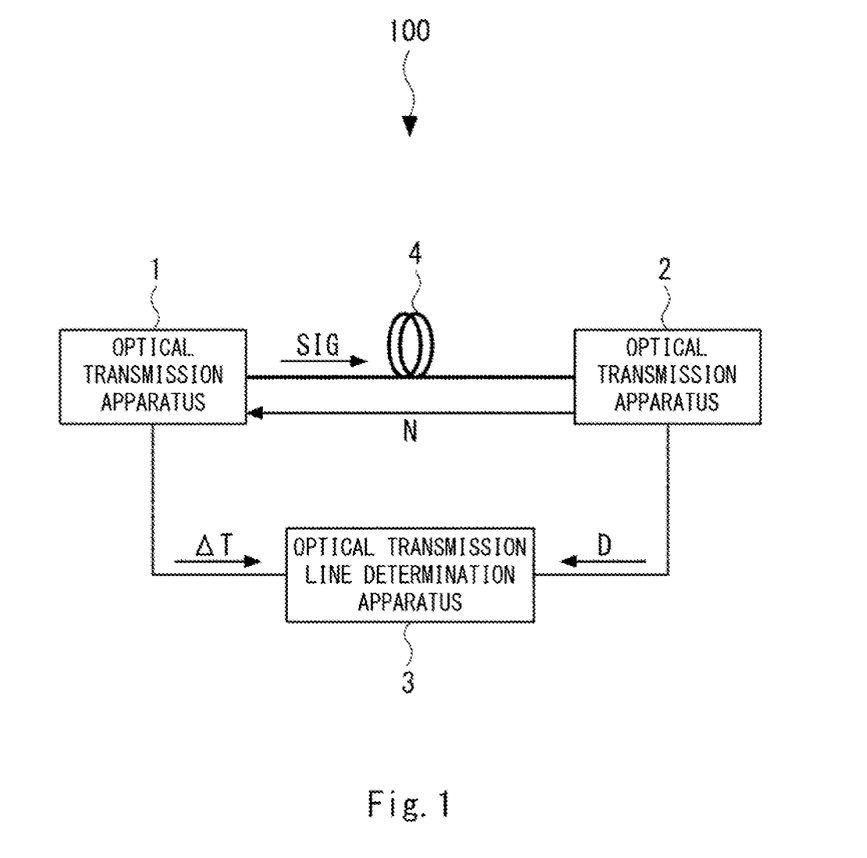
FIG. 1 is a diagram schematically showing a configuration of an optical communication system according to a first example embodiment.

An optical communication system according to the first example embodiment will be described. FIG. 1 schematically shows a configuration of an optical communication system 100 according to the first example embodiment. The optical communication system 100 has an optical transmission apparatus 1, an optical transmission apparatus 2, an optical transmission line determination apparatus 3, and an optical transmission line 4. The optical transmission apparatus 1 and the optical transmission apparatus 2 are communicably connected to each other via the optical transmission line 4. The optical transmission apparatuses 1 and 2 are configured as apparatuses capable of transmitting and receiving optical signals to and from each other via the optical transmission line 4. The optical transmission line determination apparatus 3 makes a determination related to the optical transmission line 4 based on information acquired from the optical transmission apparatuses 1 and 2.

Hereinafter, a case where an optical signal SIG is sent from the optical transmission apparatus 1 and received by the optical transmission apparatus 2 will be described on the assumption that the optical transmission line determination apparatus 3 is to determine a type of the optical transmission line 4.

Figure 2:
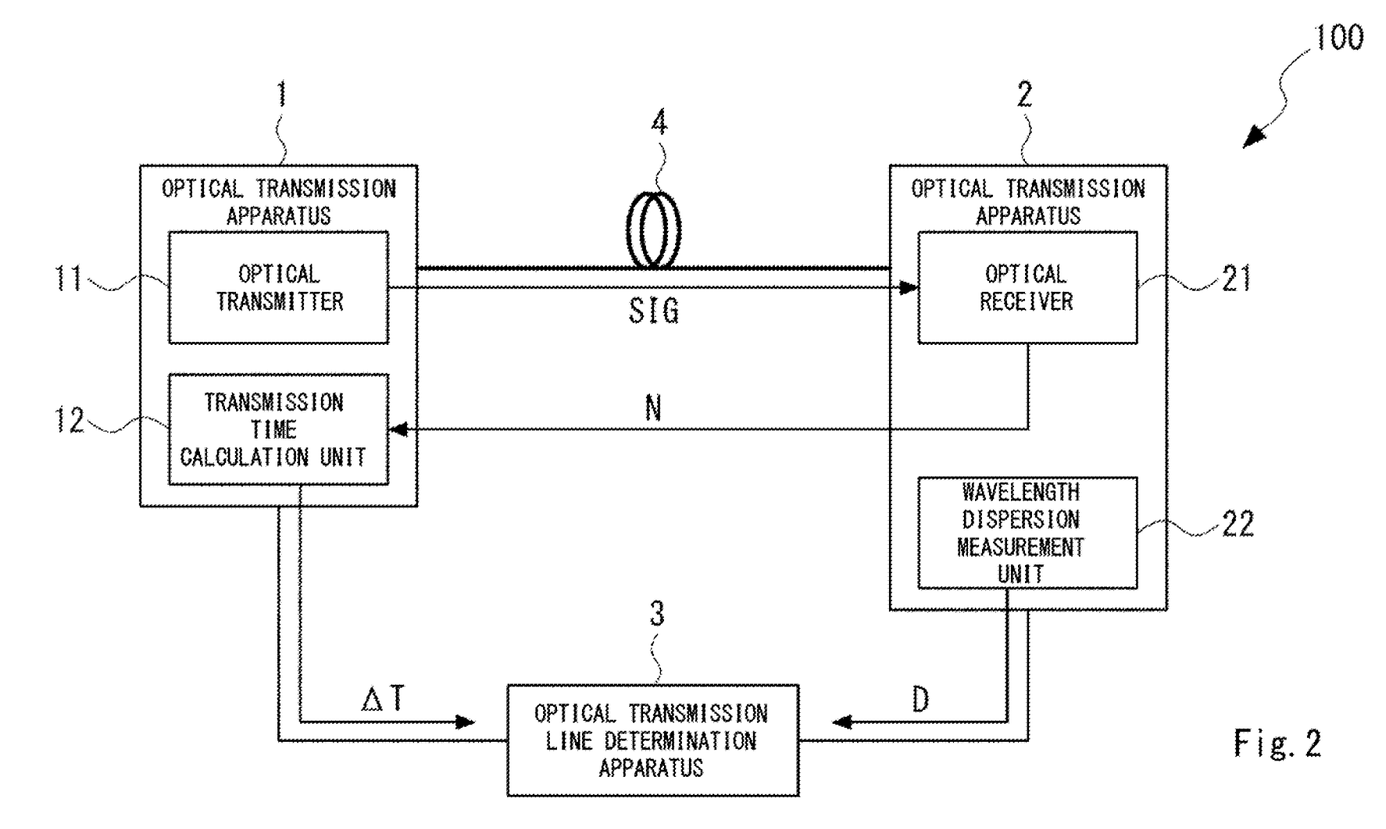
FIG. 2 is a diagram showing the configuration of the optical communication system according to the first example embodiment in greater detail.

Next, a configuration of the optical transmission apparatuses 1 and 2 will be described. FIG. 2 shows the configuration of the optical communication system 100 according to the first example embodiment in greater detail.

For example, the optical transmission apparatus 1 is configured as an apparatus mounted with an optical transceiver or the like which transmits and receives optical signals modulated by a predetermined modulation system, an OTDR (Optical Time Domain Reflectometer) apparatus, or the like. The optical transmission apparatus 1 has an optical transmitter 11 and a transmission time calculation unit 12. The optical transmitter 11 outputs the optical signal SIG to the optical transmission line 4. The transmission time calculation unit 12 receives a notification signal N output from the optical transmission apparatus 2. Based on the notification signal N, the transmission time calculation unit 12 calculates a transmission time $\Delta T$ required for the optical signal SIG to be transmitted through the optical transmission line 4 and outputs the calculated transmission time $\Delta T$ to the optical transmission line determination apparatus 3.

For example, the optical transmission apparatus 2 is configured as an apparatus mounted with an optical transceiver or the like which transmits and receives optical signals modulated by a predetermined modulation system, or the like. The optical transmission apparatus 2 has an optical receiver 21 and a wavelength dispersion measurement unit 22. The optical receiver 21 receives the optical signal SIG transmitted by the optical transmission line 4 and sends the notification signal N indicating a reception timing $T_R$ to the optical transmission line 4. The wavelength dispersion measurement unit 22 measures a wavelength dispersion D of the received optical signal SIG and outputs the measured wavelength dispersion D to the optical transmission line determination apparatus 3.

The notification signal N may be an optical signal transmitted though the optical transmission line 4 or an optical signal transmitted through an optical transmission line other than the optical transmission line 4. In addition, the notification signal N may be transmitted from the optical transmission apparatus 2 to the optical transmission apparatus 1 via an arbitrary communication path and arbitrary communication means other than an optical transmission line.

Figure 3:
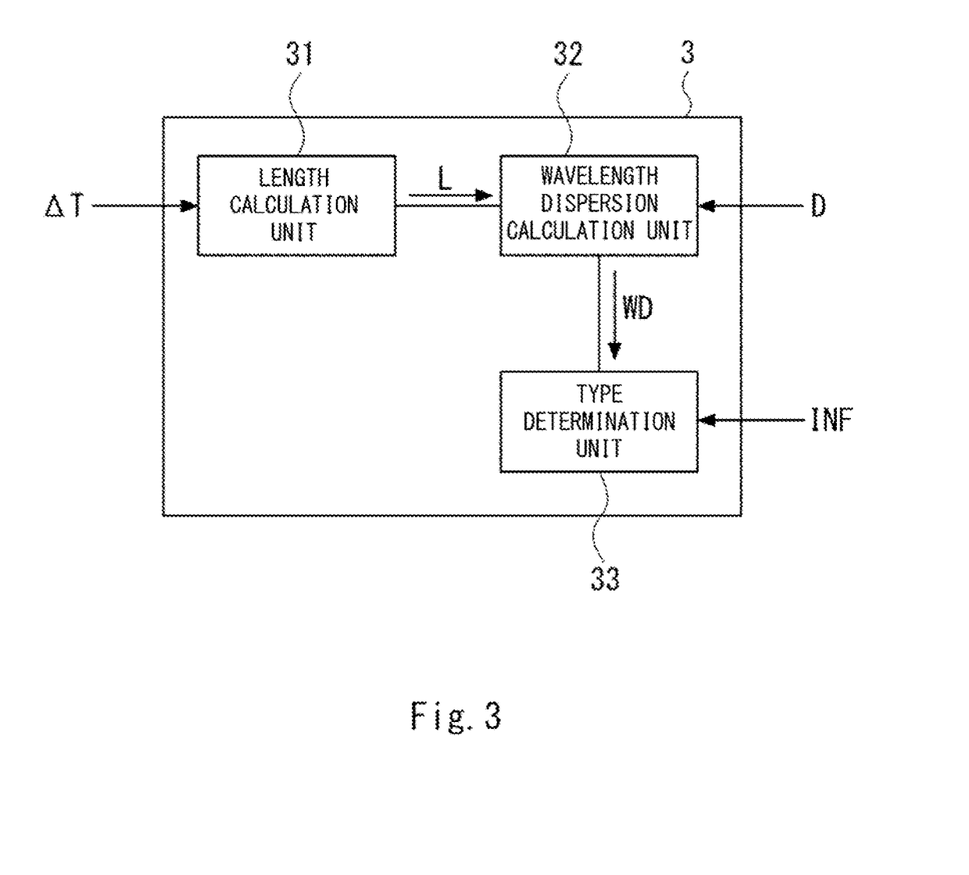
FIG. 3 is a diagram schematically showing a configuration of an optical transmission line determination apparatus according to the first example embodiment.

Next, a configuration of the optical transmission line determination apparatus 3 will be described. FIG. 3 schematically shows a configuration of the optical transmission line determination apparatus 3 according to the first example embodiment. The optical transmission line determination apparatus 3 has a length calculation unit 31, a wavelength dispersion calculation unit 32, and a type determination unit 33. The length calculation unit 31 calculates a length L of the optical transmission line 4 based on the transmission time $\Delta T$. The wavelength dispersion calculation unit 32 calculates a wavelength dispersion WD per unit length of the optical transmission line 4 from a transmission distance L and the measured wavelength dispersion D.

The type determination unit 33 refers to information INF indicating a type of the optical transmission line 4 or, more specifically, a correspondence relationship between a type of an optical fiber and a value of the wavelength dispersion per unit length of the optical fiber, and determines which type of an optical transmission line the calculated wavelength dispersion WD per unit length corresponds to.

The information INF indicating the correspondence relationship between a type of an optical fiber and a value of the wavelength dispersion per unit length of the optical fiber may be given to the optical transmission line determination apparatus 3 in advance or when necessary. In addition, the information INF indicating the correspondence relationship between a type of an optical fiber and a value of the wavelength dispersion per unit length of the optical fiber may be stored in a storage unit provided in the optical transmission line determination apparatus 3.

Figure 4:
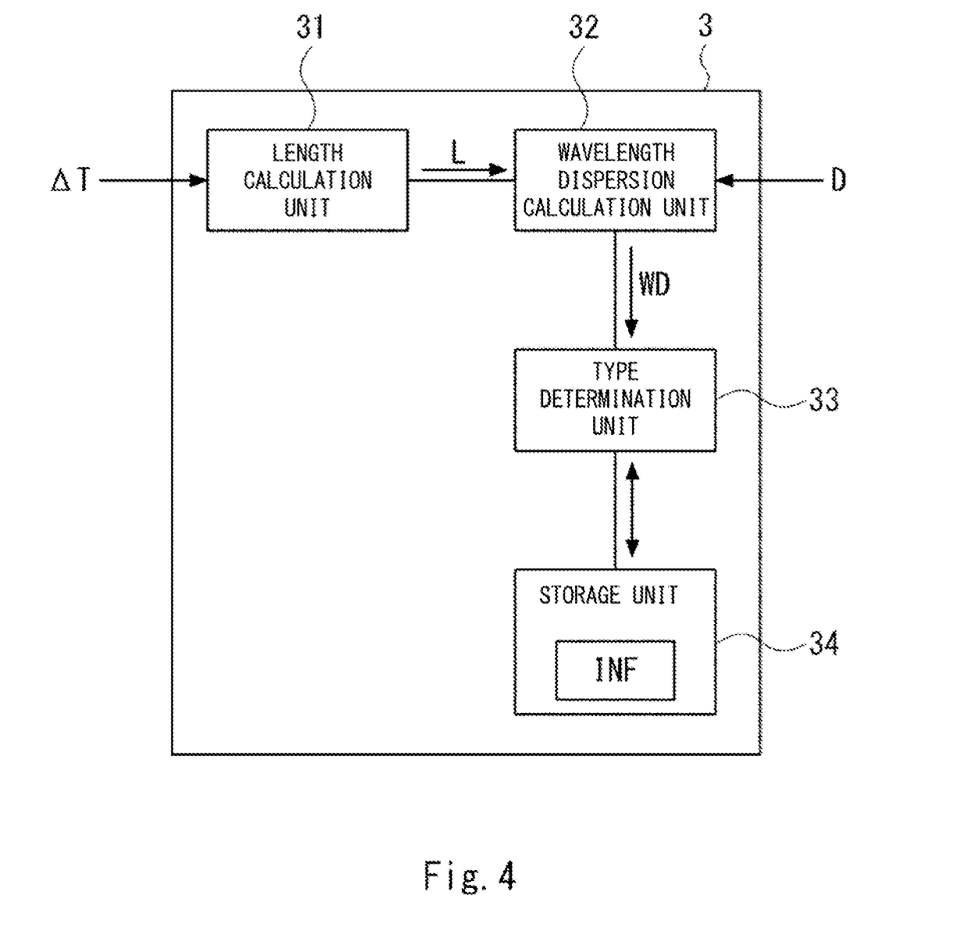
FIG. 4 is a diagram schematically showing a configuration of the optical transmission line determination apparatus provided with a storage unit.

FIG. 4 schematically shows a configuration of the optical transmission line determination apparatus 3 provided with a storage unit. As shown in FIG. 4, the optical transmission line determination apparatus 3 may further have a storage unit 34. In this case, the type determination unit 33 is configured to be capable of reading information stored in the storage unit 34 and writing information to the storage unit 34 as necessary. The storage unit 34 stores the information INF indicating the correspondence relationship between a type of an optical fiber and a value of the wavelength dispersion per unit length of the optical fiber as table information.

Figure 5:
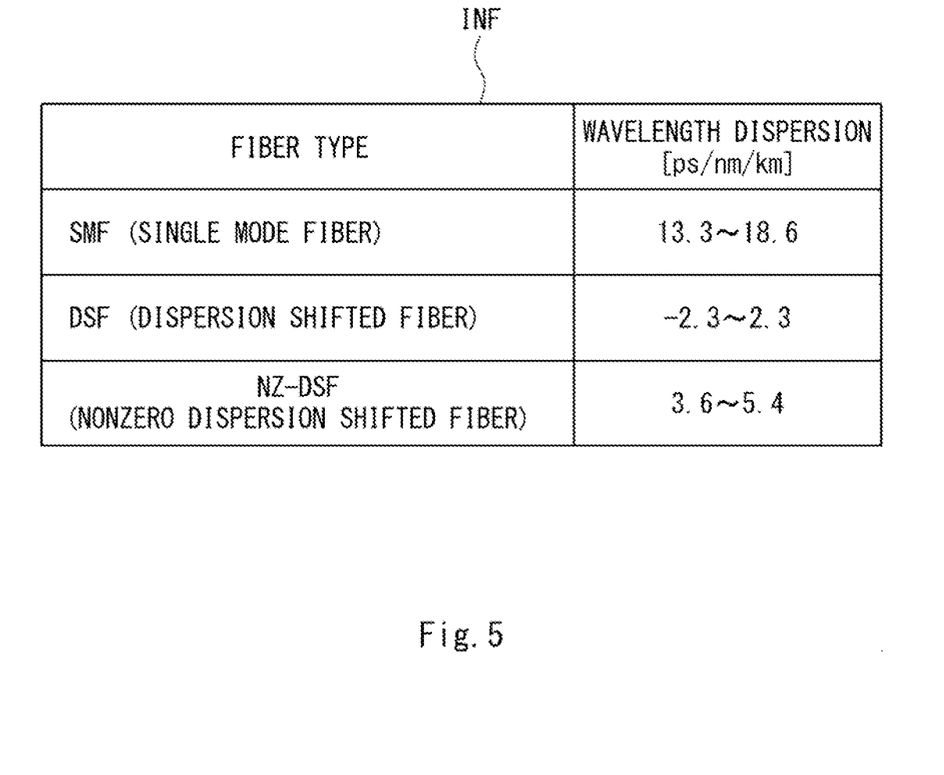
FIG. 5 is a diagram schematically showing an example of table information according to the first example embodiment.

FIG. 5 schematically shows an example of the information INF indicating the correspondence relationship between a type of an optical fiber and a value of the wavelength dispersion per unit length of the optical fiber. For example, the information INF is configured as information indicating a wavelength dispersion per unit length of each of SMF (Single Mode Fiber), DSF (Dispersion Shifted Fiber), and NZ-DSF (Nonzero Dispersion Shifted Fiber).

The type determination unit 33 refers to the information INF and determines which type of an optical transmission line the calculated wavelength dispersion WD per unit length corresponds to.

Figure 6:
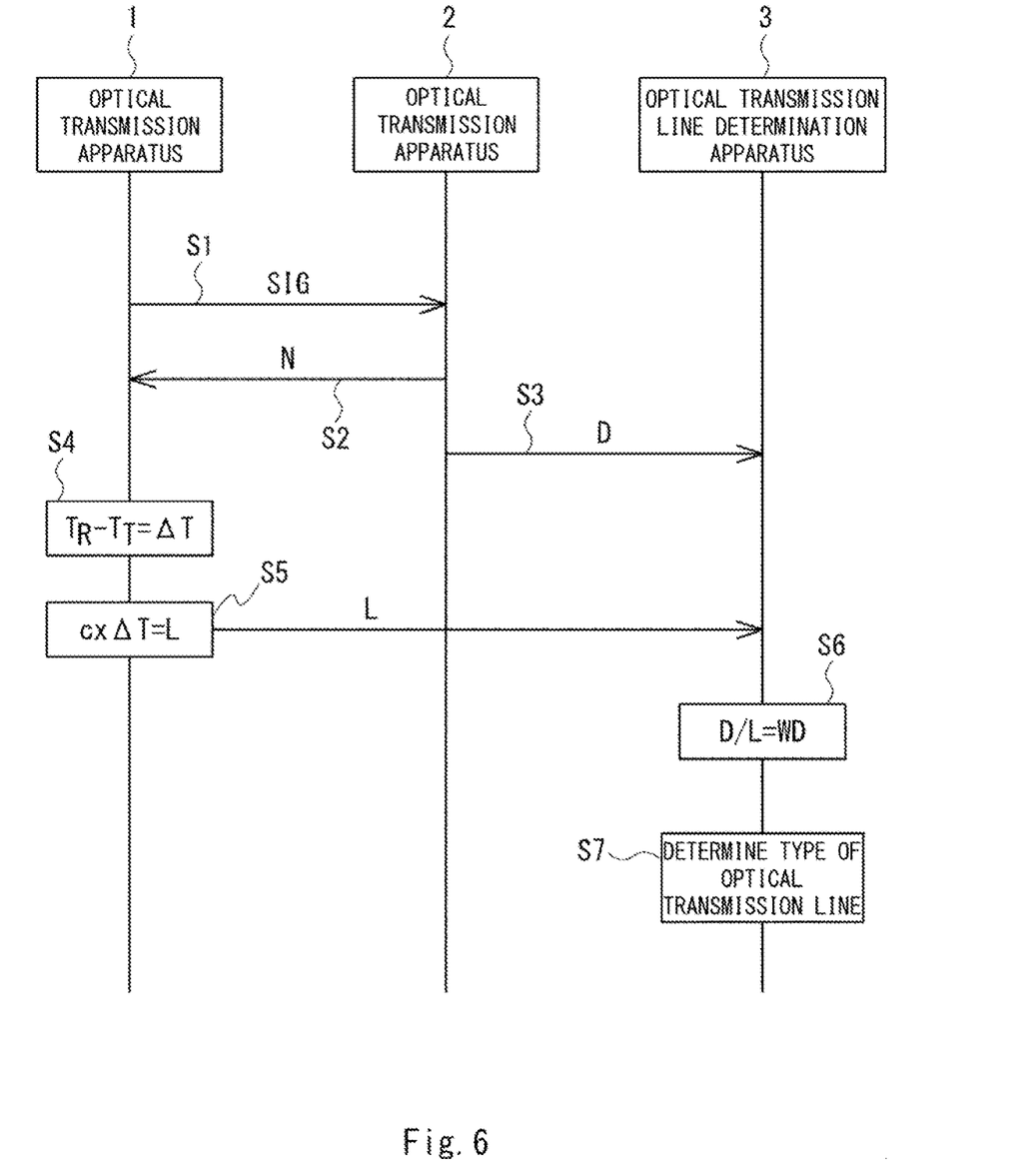
FIG. 6 is a diagram showing a sequence of a determination method of a type of an optical transmission line in the optical communication system according to the first example embodiment.

Next, a determination method of a type of an optical transmission line in the optical communication system 100 will be described. FIG. 6 shows a sequence of a determination method of a type of an optical transmission line in the optical communication system 100 according to the first example embodiment.

Step S1

The optical transmitter 11 sends the optical signal SIG to the optical transmission line 4 and stores a transmission timing $T_T$.

Step S2

The optical receiver 21 receives the optical signal SIG transmitted by the optical transmission line 4 and sends the notification signal N indicating a reception timing $T_R$ to the optical transmission line 4.

Step S3

The wavelength dispersion measurement unit 22 measures the wavelength dispersion D of the optical signal SIG transmitted by the optical transmission line 4. In addition, the wavelength dispersion measurement unit 22 outputs the measured wavelength dispersion D to the optical transmission line determination apparatus 3.

Step S4

The transmission time calculation unit 12 receives the notification signal N via the optical transmission line 4 and, based on the notification signal N, calculates a difference $\Delta T$ between the reception timing $T_R$ and the transmission timing $T_T$. The calculated difference $\Delta T$ represents a time $\Delta T$ from the transmission of the optical signal SIG from the optical transmission apparatus 1 until the optical signal SIG is received by the optical transmission apparatus 2 or, in other words, the transmission time $\Delta T$ required for the optical signal SIG to propagate through the optical transmission line 4. Note that, when there is a delaying factor of the optical signal SIG other than the propagation through the optical transmission line 4, a value obtained by subtracting a delay due to the delaying factor from the difference described above may be adopted as the transmission time $\Delta T$.

Step S5

The length calculation unit 31 calculates a length L of the optical transmission line 4 from the velocity of light $c_M$ in a medium (in other words, an optical fiber) constituting the optical transmission line 4 given in advance and the transmission time $\Delta T$ required for the optical signal SIG to propagate through the optical transmission line 4 ($c_M \times \Delta T = L$). In addition, if the velocity of light in vacuum is denoted by c and a refractive index of the medium (in other words, the optical fiber) constituting the optical transmission line 4 is denoted by n, then the length L of the optical transmission line 4 is expressed as $L = c/n \times \Delta T$ ($c/n = c_M$). Furthermore, the calculated length L of the optical transmission line 4 is output to the optical transmission line determination apparatus 3.

Step S6

The wavelength dispersion calculation unit 32 calculates a wavelength dispersion WD per unit length of the optical transmission line 4 by dividing the wavelength dispersion D measured by the optical transmission apparatus 2 by the distance L ($D/L = WD$).

Step S7

The type determination unit 33 refers to information INF indicating a correspondence relationship between a type of an optical fiber and a value of the wavelength dispersion per unit length of the optical fiber, and determines which type of an optical transmission line or, more specifically, which type of optical fiber the calculated wavelength dispersion WD per unit length corresponds to.

As described above, according to the present configuration, a type of an optical transmission line which connects two optical transmission apparatuses to each other can be automatically determined.

The optical transmission line determination apparatus 3 may output information indicating the determined type of an optical transmission line to another processing apparatus such as a network management system (NMS) which monitors and controls the optical communication system 100. Accordingly, a manager or a user of the optical communication system 100 can learn the type of the optical transmission line 4 and, based on the information, determine operational conditions and the like of an optical transmission apparatus which transmits and receives optical signals transmitted by the optical transmission line 4.

The optical transmission line determination apparatus 3 may identify other characteristics of the optical transmission line of which the type had been determined, such as a differential group delay (DGD) or a nonlinear constant. In this case, by storing the DGD or the nonlinear constant for each type of optical transmission line in the information INF indicating a correspondence relationship between a type of an optical fiber and a value of the wavelength dispersion per unit length of the optical fiber described above, the optical transmission line determination apparatus 3 can identify other characteristics such as the DGD or the nonlinear constant. It is needless to say that the other processing apparatuses described above may identify the other characteristics such as the DGD or the nonlinear constant corresponding to the determined type of the optical transmission line. System design of the optical communication system 100 can be performed in a more flexible manner in further consideration of identified characteristics.

In addition, in the present configuration, when calculating the transmission time $\Delta T$ of an optical signal with the optical transmission apparatus 1, a delay monitoring mechanism of an optical signal which is generally provided in an optical transmission apparatus can be used. Therefore, the transmission time ΔT can be acquired without adding a function or a component to the optical transmission apparatus 1.

Furthermore, in the present configuration, when measuring a dispersion of an optical signal with the optical transmission apparatus 2, a wavelength dispersion function which is generally provided in an optical transmission apparatus can be used as the wavelength dispersion measurement unit 22. Therefore, the wavelength dispersion of an optical signal can be acquired without adding a function or a component to the optical transmission apparatus 2.

Other Example Embodiments

The present disclosure is not limited to the example embodiment described above and can be appropriately modified without deviating from the scope and spirit of the disclosure. For example, the optical transmission line determination apparatus 3 may calculate other characteristics of the optical transmission line of which the type had been determined such as a transmission loss in the optical transmission line 4. In this case, the optical transmission line determination apparatus 3 can calculate a transmission loss by receiving information indicating transmission power of the optical signal SIG from the optical transmission apparatus 1 and receiving information indicating reception power of the optical signal SIG from the optical transmission apparatus 2.

The optical transmission line determination apparatus 3 may be incorporated into a processing apparatus such as the NMS described above or the optical transmission line determination apparatus 3 may be realized using a calculation function of a processing apparatus such as the NMS.

The information INF indicating the correspondence relationship between a type of an optical fiber and a value of the wavelength dispersion per unit length of the optical fiber may be given to the type determination unit 33 from a processing apparatus such as the NMS described above. In addition, the information INF indicating the correspondence relationship between a type of an optical fiber and a value of the wavelength dispersion per unit length of the optical fiber having been given by a processing apparatus such as the NMS described above may be stored in the storage unit 34.

While the optical transmission line determination apparatus 3 according to the present disclosure has been explained as a hardware component in the example embodiment described above, the present disclosure is not limited to a hardware configuration. The present disclosure can also realize processing in the optical transmission line determination apparatus 3 by causing a CPU (central processing unit) to execute a computer program. In addition, the program described above can be stored and provided to a computer using any type of non-transitory computer-readable media. Non-transitory computer-readable media include any type of tangible storage media. Examples of non-transitory computer-readable media include magnetic storage media (such as a floppy disk, a magnetic tape, and a hard disk drive), optical magnetic storage media (such as a magneto-optical disk), CD-ROM (compact disc read only memory), CD-R (compact disc recordable), CD-R/W (compact disc rewritable), and semiconductor memories (such as a mask ROM, a PROM (programmable ROM), an EPROM (erasable PROM), a flash ROM, and a RAM (random access memory)). The program may be provided to a computer using any type of transitory computer readable media. Examples of transitory computer readable media include an electric signal, an optical signal, and electromagnetic waves. Transitory computer readable media can provide the program to a computer via a wired communication line (such as an electric wire or an optical fiber) or a wireless communication line.

An example of a computer will now be described. The computer can be realized by various kinds of computers including a dedicated computer and a personal computer (PC). However, the computer need not be physically singular and may be provided in plurality when executing distributed processing.

Figure 7:
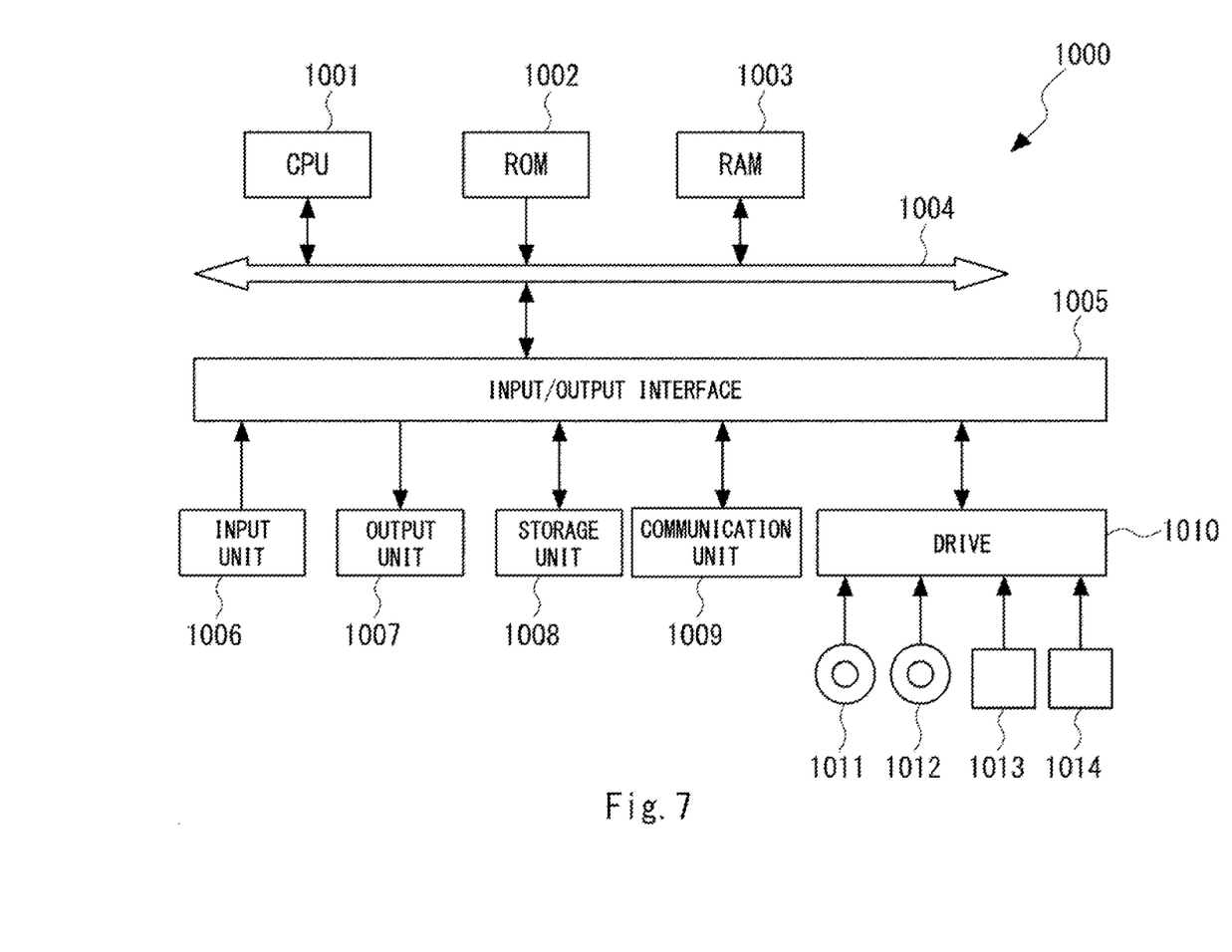
FIG. 7 is a diagram showing a configuration example of a computer.

FIG. 7 shows a configuration example of a computer. A computer 1000 shown in FIG. 7 has a CPU (Central Processing Unit) 1001, a ROM (Read Only Memory) 1002, and a RAM (Random Access Memory) 1003 which are connected to each other via a bus 1004. While descriptions of OS software and the like for operating the computer will be omitted, it is assumed that the computer which constructs the information processing apparatus naturally has such OS software and the like.

An input/output interface 1005 is also connected to the bus 1004. For example, an input unit 1006 made of a keyboard, a mouse, a sensor, or the like, an output unit 1007 made of a display which is a CRT, LCD, or the like, a headphone, a speaker, or the like, a storage unit 1008 constituted of a hard disk or the like, and a communication unit 1009 constituted of a modem, a terminal adapter, or the like are connected to the input/output interface 1005.

The CPU 1001 executes various types of processing including, in the present example embodiment, processing by various units of an information processing apparatus 100 to be described later according to various programs stored in the ROM 1002 or various programs loaded to the RAM 1003 from the storage unit 1008. Alternatively, a GPU (Graphics Processing Unit) may be provided to perform various types of processing including, in the present example embodiment, processing by various units of the information processing apparatus 100 to be described later according to various programs stored in the ROM 1002 or various programs loaded to the RAM 1003 from the storage unit 1008 in a similar manner to the CPU 1001. Note that a GPU is suitable for applications where routine processing is performed in parallel and, by applying a GPU to processing in a neural network to be described later or the like, processing speed can be improved as compared to the CPU 1001. The RAM 1003 also stores, when appropriate, data necessary for the CPU 1001 and the GPU to execute the various types of processing.

For example, the communication unit 1009 performs communication processing via the Internet (not illustrated), sends data provided by the CPU 1001, outputs data received from a communication partner to the CPU 1001, the RAM 1003, and the storage unit 1008, and the like. The storage unit 1008 interacts with the CPU 1001 and stores or erases information. The communication unit 1009 also performs communication processing of analog signals or digital signals with other apparatuses.

As necessary, a drive 1010 is connected to the input/output interface 1005 and, for example, a magnetic disk 1011, an optical disc 1012, a floppy disk 1013, a semiconductor memory 1014, or the like is appropriately mounted to the drive 1010 and a computer program read therefrom is installed in the storage unit 1008 as necessary.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

(Supplementary Note 1)

An optical transmission line determination apparatus including: a length calculation unit configured to calculate, based on a transmission time required for an optical signal transmitted from a first optical transmission apparatus to a second optical transmission apparatus through an optical transmission line to be transmitted through the optical transmission line, a length of the optical transmission line; a wavelength dispersion calculation unit configured to calculate a wavelength dispersion per unit length of the optical transmission line based on a wavelength dispersion of the optical signal received by the second optical transmission apparatus and the length of the optical transmission line; and a type determination unit configured to determine a type of the optical transmission line based on information indicating a correspondence relationship between a value of the wavelength dispersion per unit length and the type of the optical transmission line and the calculated wavelength dispersion per unit length of the optical transmission line.

(Supplementary Note 2)

The optical transmission line determination apparatus according to Supplementary note 1, further including a storage unit configured to store the information indicating the correspondence relationship between the value of the wavelength dispersion per unit length and the type of the optical transmission line.

(Supplementary Note 3)

The optical transmission line determination apparatus according to Supplementary note 1 or 2, in which the second optical transmission apparatus is configured to output, to the first optical transmission apparatus, a notification signal which provides notice of a timing where the optical signal reaches the second optical transmission apparatus, and the first optical transmission apparatus is configured to calculate, as the transmission time, a difference between the timing where the optical signal reaches the second optical transmission apparatus and a timing where the optical signal is sent to the second optical transmission apparatus based on the notification signal and to output the transmission time to the length calculation unit.

(Supplementary Note 4)

The optical transmission line determination apparatus according to any one of Supplementary notes 1 to 3, in which the second optical transmission apparatus is configured to measure a wavelength dispersion of the optical signal received by the second optical transmission apparatus and to output the measured wavelength dispersion to the wavelength dispersion calculation unit.

(Supplementary Note 5)

An optical communication system including: a first optical transmission apparatus configured to send an optical signal; a second optical transmission apparatus configured to receive the optical signal; an optical transmission line configured to connect the first optical transmission apparatus and the second optical transmission apparatus to each other and to transmit the optical signal; and an optical transmission line determination apparatus configured to determine a type of the optical transmission line, in which the optical transmission line determination apparatus includes: a length calculation unit configured to calculate, based on a transmission time required for the optical signal transmitted from the first optical transmission apparatus to the second optical transmission apparatus through the optical transmission line to be transmitted through the optical transmission line, a length of the optical transmission line; a wavelength dispersion calculation unit configured to calculate a wavelength dispersion per unit length of the optical transmission line based on a wavelength dispersion of the optical signal received by the second optical transmission apparatus and the length of the optical transmission line; and a type determination unit configured to determine a type of the optical transmission line based on information indicating a correspondence relationship between a value of the wavelength dispersion per unit length and the type of the optical transmission line and the calculated wavelength dispersion per unit length of the optical transmission line.

(Supplementary Note 6)

The optical communication system according to Supplementary note 5, in which the optical transmission line determination apparatus further includes a storage unit configured to store the information indicating the correspondence relationship between the value of the wavelength dispersion per unit length and the type of the optical transmission line.

(Supplementary Note 7)

The optical communication system according to Supplementary note 5 or 6, in which the second optical transmission apparatus is configured to output, to the first optical transmission apparatus, a notification signal which provides notice of a timing where the optical signal reaches the second optical transmission apparatus, and the first optical transmission apparatus is configured to calculate, as the transmission time, a difference between the timing where the optical signal reaches the second optical transmission apparatus and a timing where the optical signal is sent to the second optical transmission apparatus based on the notification signal and to output the transmission time to the length calculation unit.

(Supplementary Note 8)

The optical communication system according to any one of Supplementary notes 5 to 7, in which the second optical transmission apparatus is configured to measure a wavelength dispersion of the optical signal received by the second optical transmission apparatus and to output the measured wavelength dispersion to the wavelength dispersion calculation unit.

(Supplementary Note 9)

An optical transmission line determination method including: calculating, based on a transmission time required for an optical signal transmitted from a first optical transmission apparatus to a second optical transmission apparatus through an optical transmission line to be transmitted through the optical transmission line, a length of the optical transmission line; calculating a wavelength dispersion per unit length of the optical transmission line based on a wavelength dispersion of the optical signal received by the second optical transmission apparatus and the length of the optical transmission line; and determining a type of the optical transmission line based on information indicating a correspondence relationship between a value of the wavelength dispersion per unit length and the type of the optical transmission line and the calculated wavelength dispersion per unit length of the optical transmission line.

(Supplementary Note 10)

A program causing a computer to execute processing of: calculating, based on a transmission time required for an optical signal transmitted from a first optical transmission apparatus to a second optical transmission apparatus through an optical transmission line to be transmitted through the optical transmission line, a length of the optical transmission line; calculating a wavelength dispersion per unit length of the optical transmission line based on a wavelength dispersion of the optical signal received by the second optical transmission apparatus and the length of the optical transmission line; and determining a type of the optical transmission line based on information indicating a correspondence relationship between a value of the wavelength dispersion per unit length and the type of the optical transmission line and the calculated wavelength dispersion per unit length of the optical transmission line.

What is claimed is:

1. An optical transmission line determination apparatus comprising:
    a length calculation unit configured to calculate, based on a transmission time required for an optical signal transmitted from a first optical transmission apparatus to a second optical transmission apparatus through an optical transmission line to be transmitted through the optical transmission line, a length of the optical transmission line;
    a wavelength dispersion calculation unit configured to calculate a wavelength dispersion per unit length of the optical transmission line based on a wavelength dispersion of the optical signal received by the second optical transmission apparatus and the length of the optical transmission line; and
    a type determination unit configured to determine a type of the optical transmission line based on information indicating a correspondence relationship between a value of the wavelength dispersion per unit length and the type of the optical transmission line and the calculated wavelength dispersion per unit length of the optical transmission line.

2. The optical transmission line determination apparatus according to claim 1, further comprising a storage unit configured to store the information indicating the correspondence relationship between the value of the wavelength dispersion per unit length and the type of the optical transmission line.

3. The optical transmission line determination apparatus according to claim 1, wherein
    the second optical transmission apparatus is configured to output, to the first optical transmission apparatus, a notification signal which provides notice of a timing where the optical signal reaches the second optical transmission apparatus, and
    the first optical transmission apparatus is configured to calculate, as the transmission time, a difference between the timing where the optical signal reaches the second optical transmission apparatus and a timing where the optical signal is sent to the second optical transmission apparatus based on the notification signal and to output the transmission time to the length calculation unit.

4. The optical transmission line determination apparatus according to claim 1, wherein the second optical transmission apparatus is configured to measure a wavelength dispersion of the optical signal received by the second optical transmission apparatus and to output the measured wavelength dispersion to the wavelength dispersion calculation unit.

5. An optical transmission line determination method comprising:
    calculating, based on a transmission time required for an optical signal transmitted from a first optical transmission apparatus to a second optical transmission apparatus through an optical transmission line to be transmitted through the optical transmission line, a length of the optical transmission line;
    calculating a wavelength dispersion per unit length of the optical transmission line based on a wavelength dispersion of the optical signal received by the second optical transmission apparatus and the length of the optical transmission line; and
    determining a type of the optical transmission line based on information indicating a correspondence relationship between a value of the wavelength dispersion per unit length and the type of the optical transmission line and the calculated wavelength dispersion per unit length of the optical transmission line.

6. A non-transitory computer readable medium storing a program causing a computer to execute processing of:
    calculating, based on a transmission time required for an optical signal transmitted from a first optical transmission apparatus to a second optical transmission apparatus through an optical transmission line to be transmitted through the optical transmission line, a length of the optical transmission line;
    calculating a wavelength dispersion per unit length of the optical transmission line based on a wavelength dispersion of the optical signal received by the second optical transmission apparatus and the length of the optical transmission line; and
    determining a type of the optical transmission line based on information indicating a correspondence relationship between a value of the wavelength dispersion per unit length and the type of the optical transmission line and the calculated wavelength dispersion per unit length of the optical transmission line.

* * * * *